United States Patent
Hua et al.

(10) Patent No.: US 8,244,044 B2
(45) Date of Patent: Aug. 14, 2012

(54) FEATURE SELECTION AND EXTRACTION

(75) Inventors: Gang Hua, Redmond, WA (US); Paul Viola, Redmond, WA (US); David Liu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 892 days.

(21) Appl. No.: 12/109,347

(22) Filed: Apr. 25, 2008

(65) Prior Publication Data

US 2009/0316986 A1 Dec. 24, 2009

(51) Int. Cl.
*G06K 9/62* (2006.01)
*G06K 9/46* (2006.01)
(52) U.S. Cl. ......... 382/224; 382/190
(58) Field of Classification Search .......... 382/224, 382/190
See application file for complete search history.

(56) References Cited

U.S. PATENT DOCUMENTS

| | | | |
|---|---|---|---|
| 6,092,059 A * | 7/2000 | Straforini et al. | 706/14 |
| 7,043,474 B2 | 5/2006 | Mojsilovic et al. | |
| 7,099,505 B2 * | 8/2006 | Li et al. | 382/159 |
| 7,099,510 B2 | 8/2006 | Jones et al. | |
| 2005/0102246 A1 | 5/2005 | Movellan et al. | |
| 2006/0088207 A1 * | 4/2006 | Schneiderman | 382/159 |
| 2006/0126938 A1 | 6/2006 | Lee et al. | |
| 2007/0196013 A1 * | 8/2007 | Li et al. | 382/159 |
| 2007/0217688 A1 | 9/2007 | Sabe et al. | |
| 2007/0223790 A1 | 9/2007 | Xiao et al. | |
| 2007/0237387 A1 | 10/2007 | Avidan et al. | |
| 2008/0004878 A1 * | 1/2008 | Weng et al. | 704/256 |
| 2008/0240514 A1 * | 10/2008 | Zhang et al. | 382/115 |

OTHER PUBLICATIONS

Bakus et al. "Higher Order Feature Selection for Text Classification" Knowledge and Information Systems, 2006, pp. 468-491.*
Guo, et al., "Simultaneous Feature Selection and Classifier Training via Linear Programming: A Case Study for Face Expression Recognition", Proceedings of the 2003 IEEE Computer Society Conference on Computer Vision and Pattern Recognition (CVPR'03), pp. 1-7.
Blundell, et al., "Object Recognition and Feature Extraction from Imagery: The Feature Analyst Approach", 1st International Conference on Object-based Image Analysis (OBIA 2006), pp. 1-6.
Li, et al., "Optimol: Automatic Online Picture Collection via Incremental Model Learning", IEEE Conference on Computer Vision and Pattern Recognition, 2007. CVPR '07, Publication Date: Jun. 17-22, 2007, pp. 1-8.
Belongie, et al., "Shape Matching and Object Recognition Using Shape Contexts", IEEE Transactions on Pattern Analysis and Machine Intelligence, vol. 24, No. 24, Dated: Apr. 2002, pp. 509-522.

(Continued)

*Primary Examiner* — Bhavesh Mehta
*Assistant Examiner* — Utpal Shah
(74) *Attorney, Agent, or Firm* — Microsoft Corporation

(57) ABSTRACT

Image feature selection and extraction (e.g., for image classifier training) is accomplished in an integrated manner, such that higher-order features are merely developed from first-order features selected for image classification. That is, first-order image features are selected for image classification from an image feature pool, initially populated with pre-extracted first-order image features. The selected first-order classifying features are paired with previously selected first-order classifying features to generate higher-order features. The higher-order features are placed into the image feature pool as they are developed or "on-the-fly" (e.g., for use in image classifier training).

20 Claims, 9 Drawing Sheets

OTHER PUBLICATIONS

Brown, et al., "Class-Based n-gram Models of Natural Language", Computational Linguistics, vol. 18, Issue 4 (Dec. 1992), Year of Publication: 1992, pp. 467-479.

Csurka, et al., "Visual Categorization with Bags of Keypoints", ECCV, 2004, pp. 1-16.

"The PASCAL Visual Object Classes Challenge 2006 Results", http://www.pascal-network.org/challenges/VOC/voc2006/.

Fergus, et al., "Object Class Recognition by Unsupervised Scale-Invariant Learning", Computer Vision and Pattern Recognition, 2003. Proceedings. 2003 IEEE Computer Society Conference on, vol. 2 (2003), pp. II-264-II-271 vol. 2.

Fleuret, "Fast Binary Feature Selection with Conditional Mutual Information", Journal of Machine Learning Research 5 (2004), Published: Nov. 2004, pp. 1531-1555.

Guyon, et al., "An Introduction to Variable and Feature Selection", Journal of Machine Learning Research 3 (2003), Published Mar. 2003, pp. 1157-1182.

Lan, et al., "Local bi-gram Model for Object Recognition", Tech. Report MSR-TR-2007-54, Microsoft Research, 2007, pp. 1-8.

Lazebnik, et al., "Beyond Bags of Features: Spatial Pyramid Matching for Recognizing Natural Scene Categories", Proceedings of the 2006 IEEE Computer Society Conference on Computer Vision and Pattern Recognition (CVPR'06), Year of Publication: 2006, pp. 2169-2178.

Lowe, "Distinctive Image Features from Scale-Invariant Keypoints", Dated: Jan. 5, 2004, Accepted for publication in the International Journal of Computer Vision, 2004, pp. 1-28.

Nowak, et al., "Sampling Strategies for Bag-of-Features Image Classification", ECCV 2006, Part IV, LNCS 3954, Dated: 2006, pp. 490-503.

Porikli, "Integral Histogram: A Fast Way to Extract Histograms in Cartesian Spaces", Proceedings of the 2005 IEEE Computer Society Conference on Computer Vision and Pattern Recognition (CVPR '05), vol. 1-vol. 01, Year of Publication: 2005, pp. 829-836.

Savarese, et al., "Discriminative Object Class Models of Appearance and Shape by Correlatons", Proceedings of the 2006 IEEE Computer Society Conference on Computer Vision and Pattern Recognition (CVPR'06)—vol. 2, Year of Publication: 2006, pp. 2033-2040.

Vidal-Naquet, et al., "Object Recognition with Informative Features and Linear Classification", Proceedings of the Ninth IEEE International Conference on Computer Vision—vol. 2, Year of Publication: 2003, pp. 281-288.

Viola, et al., "Rapid Object Detection Using a Boosted Cascade of Simple Features", Accepted Conference on Computer Vision and Pattern Recognition, Dated: 2001, pp. 1-9.

Yang, et al., "Multiple Class Segmentation Using a Unified Framework over Mean-Shift Patches", IEEE Conference on Computer Vision and Pattern Recognition, 2007 (CVPR '07), Publication Date: Jun. 17-22, 2007, pp. 1-8.

Zhang, et al., "Local Features and Kernels for Classification of Texture and Object Categories: A Comprehensive Study", International Journal of Computer Vision, First online version published in Sep. 2006, 26 Pages.

Zhu, et al., "Multi-class AdaBoost", Dated: Jan. 12, 2006, 21 Pages.

"Textons, the elements of texture perception, and their interactions", Bela Julesz, Nature, vol. 290, Mar. 12, 1981, pp. 91-97.

"CMSC 754 Computational Geometry", David M. Mount, 2002, reprinted from the Internet at: http://www.cs.umd.edu/~mount/754/Lects/754lects.pdf.

* cited by examiner

FEATURE SELECTION AND EXTRACTION

BACKGROUND

In image processing and/or computer vision, features are pieces of information about an image that may be used to classify the image or detect objects within the image. Image features may include, for example, specific points in an image, such as corners and/or edges, general pixel neighborhood patches, spatial relationships between specific features, and/or motion in image sequences. Image classification may be used in image processing and/or computer vision for such purpose as biometric scanning, event detection, robotic processing, image searching, and/or training of image processors, for example. 7 h

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In computer environments, pattern recognition and image object classification may be used for a variety of purposes. For example, in computer vision, pattern recognition may be used in robotic manufacturing where a robotic system can be guided by a computer's "visual" recognition of specific patterns of objects programmed into the system. Current pattern recognition systems and image object classifiers typically use image features to determine what an object may be. Image features can be generically described as interesting portions of an image, and may include specific points, such as an edge, corner, or object, or relationships between other features of an image, such as spatial relationships, or motion. Image features can typically be extracted from an image by developing "descriptors" that describe statistical characteristics about the feature. For example, gradient, color, edges, and/or gray-level pixels may be used to develop statistical descriptors for a feature. In order to be useful in image classification and to train image classifiers, image features are extracted from the image. Typically, when training an image classifier the extracted features are input to an algorithm that selects features relevant to the classification. However, feature extraction can be computationally intensive. While first-order features (e.g., low-level features concerning pixel-neighborhoods or image patches) are not typically resource intensive, computing higher-level features (e.g., spatial relationships between patches) may require more computer resources, including storage, and may take much longer to extract.

Training image classifiers to perform image classification can be both time consuming and require a lot of computing resources. Therefore, it may be desirable to have a method and system that integrates image feature selection and extraction, such that, merely relevant higher-order features are extracted, and they are extracted as needed.

Techniques and systems for integrating image feature selection and extraction are provided herein, such that higher-order features are extracted merely using those first-order features that are selected for training image classifiers for image classification. The techniques and systems select a classifying feature (e.g., using an additive feature selection algorithm) from an image feature pool, initially populated with pre-extracted first-order features. Higher-order features are generated by pairing the selected classifying feature with respective one or more previously selected-classifying features. For example, a spatial relationship may be determined between the selected classifying feature and the respective one or more previously selected classifying features. The higher-order feature is then placed back into the image feature pool, where it may, for example, be selected for image classification.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
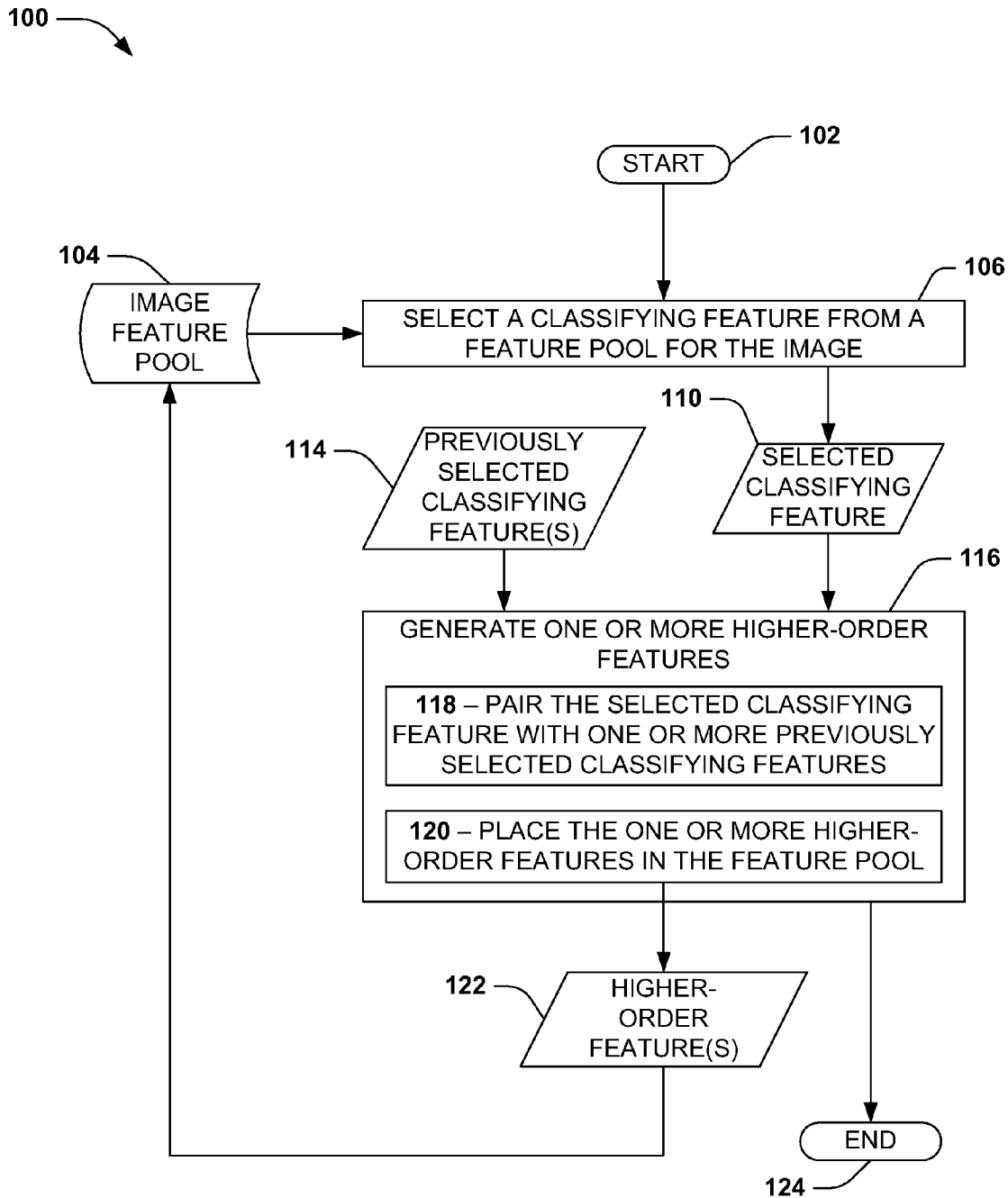
FIG. 1 is a flow diagram illustrating an exemplary method for integrated feature selection and extraction for training image classifiers.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Image pattern recognition systems traditionally utilize a three stage process, in a sort of pipeline. The first stage is feature extraction, where features of an image are extracted and placed into a feature pool. Features may include, for example, image statistics extracted from pixel neighborhoods or patches in the image, or spatial relationships between pixel neighborhoods in an image. The second stage of image pattern recognition is feature selection, where features from the feature pool are selected for classification by a selection algorithm, based on criteria set up in the algorithm (e.g., a weighted classification selection scheme for mitigating misclassification). The third stage is classification, where the selected features are used to train image classifiers, for example, by comparing to a stored image to determine a classification (e.g., people, building, mountains, scenery, etc.), in order to train the image classifier. These stages are traditionally performed in independent steps, without an integrated approach.

Often, object recognition problems involve such a large number of features that traditional feature recognition methods and systems cannot resolve them with effective speed, or may not have sufficient memory to store all of the extracted features. Feature extraction and storage can be computer resource intensive, time consuming, and extracted features may require large amounts of computer memory. Therefore, it may be desirable to extract features (that generally require extensive computation and storage) on an as needed basis.

Embodiments described herein relate to techniques and systems for integrating image feature selection and extraction (e.g., training image classifiers), such that features that may require more computational resources and/or may take longer to extract (e.g., features that describe spatial relationships) than basic local features are extracted "on-the-fly" (e.g., as needed).

Figure 3:
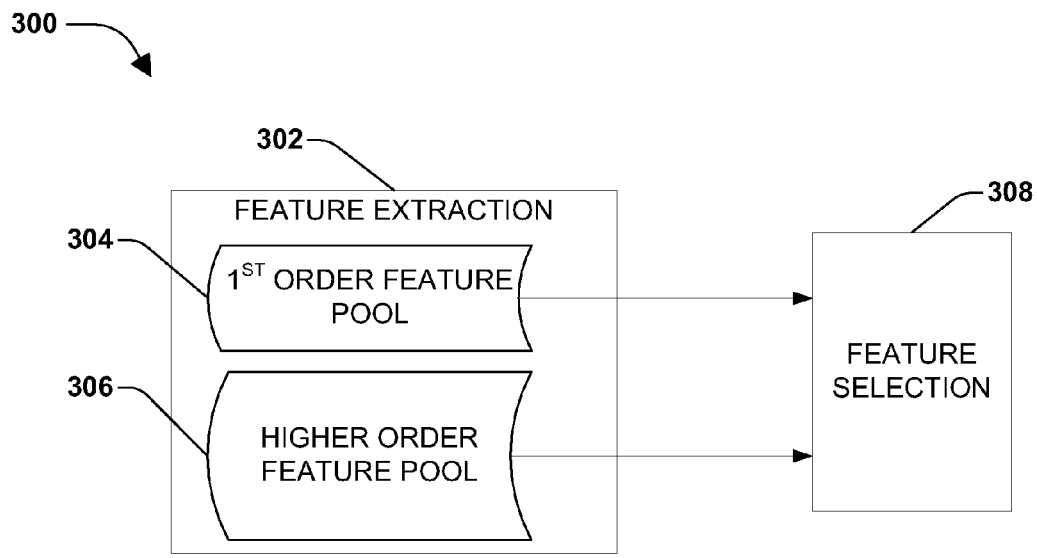
FIG. 3 is an illustration of an exemplary current method and system for non-integrated feature selection and extraction.
Figure 4:
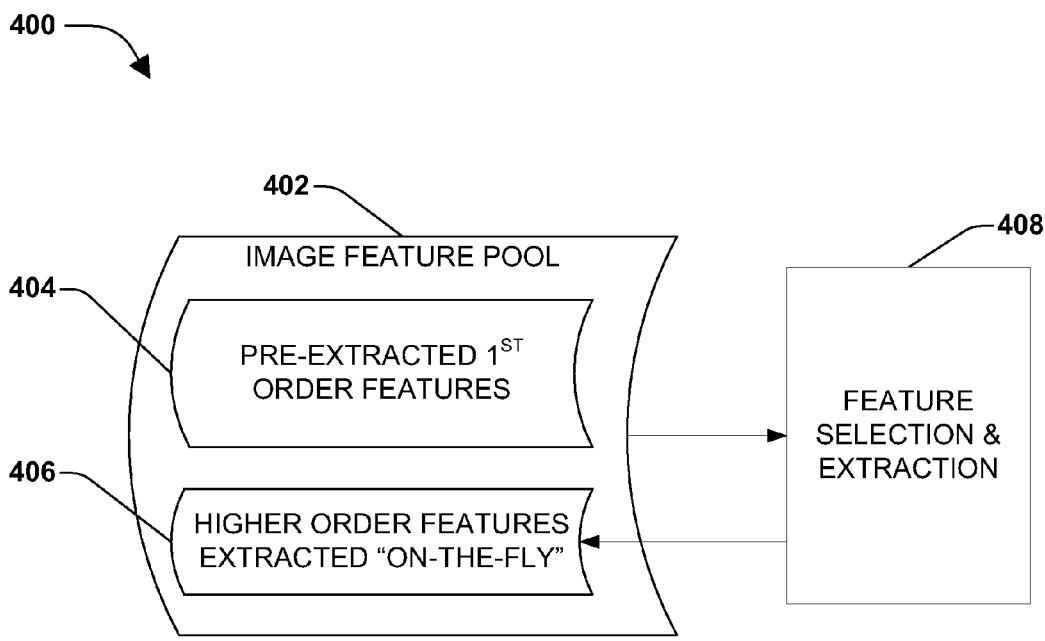
FIG. 4 is an illustration of an exemplary method and system performing integrated feature selection and extraction.

In training image classifiers (e.g., classifying objects in an image), a typical image classification trainer selects features from an image then uses the selected features to determine classification and to help to choose a next feature from the image (e.g., adaptive weighted decision algorithm). In order to perform feature selection for the image, features are pre-extracted from the image and placed into a feature pool. FIG. 3 illustrates an example 300 of current feature extraction and selection. At 302, all first-order features (e.g., a first-order feature comprising statistical values for a pixel-neighborhood patch in the image) are extracted from an image, and placed into a first-order feature pool 304; and all higher order features (e.g., a second order feature comprising a spatial relationship in the image between two first-order features) are extracted and placed into a second-order feature pool 306. Once feature extraction is complete, feature selection (e.g., for image classification) begins at 308. However, using the techniques and systems described herein, FIG. 4 illustrates an example 400 of integrated feature selection and extraction. In the example 400, merely first-order features for an image are pre-extracted 404 and placed into an image feature pool 402. At 408, feature selection (e.g., for image classification) begins, and higher order features (e.g., second-order features) are extracted from the image merely for those first-order features that have been selected (e.g., by feature selection criteria such as classification error). The extracted higher-order features, which have been extracted "on-the-fly," are sent back to the image feature pool 402, where they may be later selected (e.g., by the image classifier). Using these techniques and systems, not all of an image's second-order (or higher) features are extracted, merely those called by a selection process, which saves time and computational resources.

A method for integrated image feature selection and extraction is illustrated in FIG. 1. An exemplary method 100 begins at 102 and involves selecting a classifying feature 110 (e.g., a first-order feature) from a feature pool 104 for the image at 106. At 116 one or more higher-order features 122 (e.g., second-order features) are generated, which involves pairing the selected classifying feature 110 with one or more previously selected classifying features 114 at 118, and at 120 placing the one or more higher-order features 122 into the image feature pool 104. Having generated the one or more higher-order features, the exemplary method 100 ends at 124.

In one embodiment, an image object classifier may be used, for example, to train an event detector configured for visual surveillance of an area, for image classification. In this example, in order to speed up the process, and possibly free up computing resources, an image classification trainer, feature selection and extraction may be integrated into an adaptive boosting algorithm that uses a threshold weighted sum for feature selection, for final classification "on-the-fly." In this example, first-order features of the captured image are first extracted (e.g., every pixel of the image is examined to determine if there is an interesting feature, and interesting features are given local descriptors that represent statistical values for the feature) and as the first-order features are selected for use in classification by the algorithm, higher order features (e.g., a spatial relationship between two or more first-order features) are generated by a higher-order feature extractor integrated into the algorithm. In this example, merely those higher-order features are generated that are associated with previously selected first-order features. In this way, the classifier may select both first-order features and relevant higher-order features for a faster classification (e.g., not all higher-order features need to be extracted by the classifier, speeding-up the classification process). Further, for example, in order to facilitate speed, the classifier may have a time limit or classifying feature limit for classification. In this example, using relevant higher-order features along with pre-extracted first-order features may result in a more accurate classification.

In another embodiment, for example, and image classification trainer may be used for biometric scanning, or object classification where accuracy is more important that speed. In this embodiment, feature selection and extraction may be integrated into an additive feature selection algorithm, and selected features may be used as input into a generic image classifier. In this example, as described above, because the integrated selection and extraction extracts merely relevant higher-order features, storage requirements for storing extracted features may be reduced, as not all of the higher-order features may need to be extracted.

In another embodiment, for example, the integrated feature selection and extraction may be used in an adaptive boosting algorithm that uses a set of weighted decision stumps. In this example, the algorithm selects first-order features based on a weighted error function, and extracts higher-order features using the selected first-order features. As the algorithm proceeds, both first-order and extracted higher-order features may be selected, which in turn can configure decision stumps. The weighted decision stumps may then, for example, be used to train a support vector machine for image feature classification, or used directly as the final classifier.

Figure 2:
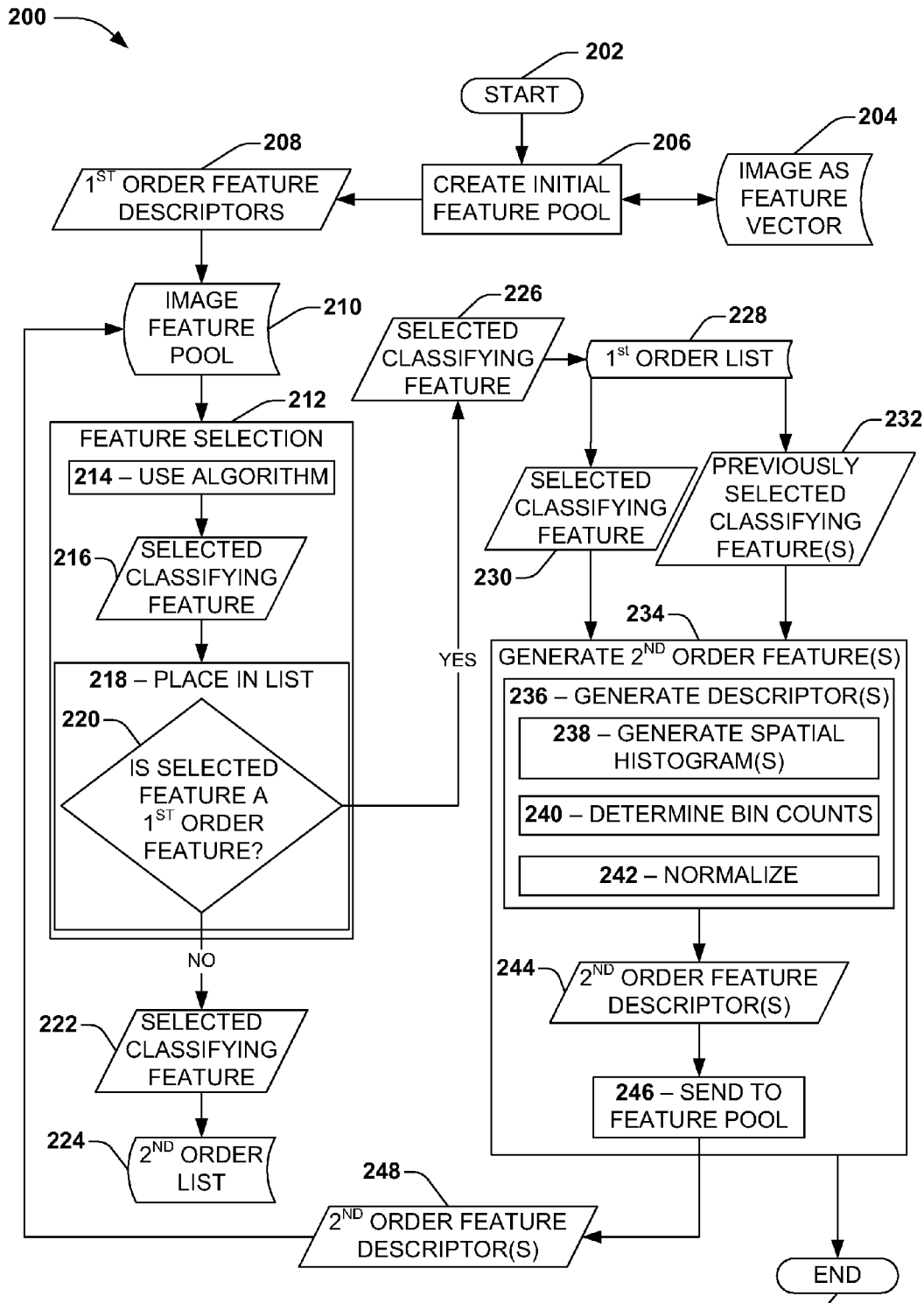
FIG. 2 is a flow diagram illustrating another exemplary method for integrated feature selection and extraction for training image classifiers.

One example of an embodiment of the methods described above is shown in FIG. 2. Exemplary method 200 begins at 202 and involves creating an initial feature pool 210 of first-order feature descriptors 208 from an image represented as a feature vector 204 at 206. It will be appreciated that representing the image as a feature vector may also be comprised within method 200, where the feature vector comprises respective features corresponding to one or more respective codewords, and values of the respective features comprise normalized histogram bin counts of the one or more respective codewords.

At 212 feature selection (e.g., for image classification) begins and involves using an (e.g., additive feature) selection algorithm for selecting features 216 from the feature pool 210

(e.g., to identify objects in the image) at 214. At 218, it is determined into which of two lists the selected classifying feature 216 will be placed at 220; if the selected classifying feature 222 is a second-order feature it is placed into a second-order list 224; if the selected classifying feature 226 is a first-order feature it is placed into a first-order list 228. At 234, one or more second order features are generated for the image 204, which involves generating respective descriptors for the one or more second-order features at 236. At 238, in order to generate one or more descriptors, a spatial histogram is generated for respective instances of the selected classifying feature 230 in the image, with respective spatial histograms having the instance of the selected classifying feature as its center. At 240, a number of instances that a previously selected classifying feature 232 falls into respective bins of the spatial histogram is determined for the respective one or more previously selected classifying features 232, resulting in a one or more bin counts for one or more respective previously selected classifying features 232. At 242, the one or more respective spatial histograms are normalized by combining corresponding bin counts from the respective one or more spatial histograms and dividing the respective combined bin counts by a number of instances of the selected classifying feature in the image for respective combined bins in the spatial histograms. The one or more normalized spatial histogram bin counts may be used as a second-order feature descriptor 244 for the spatial relationship between the selected classifying feature 230 and the one or more respective previously selected classifying features 232. At 246, the one or more second-order feature descriptors 248 are sent back to the image feature pool 210, where they may be later selected (e.g., for training an image classifier).

In one aspect, a feature selection algorithm is used to select features to classify images from an image feature pool. Initially, the image feature pool may be populated with pre-extracted first-order features, but as the integrated feature selection and extraction proceeds, for example, higher-order (e.g., second-order features describing aspatial relationships between first-order features) may be populated into the image feature pool. In this aspect, during classifying feature selection, it can be determined whether the selected classifying feature is a first-order feature. If the selected classifying feature is a first-order feature it can be stored in a list of selected first-order classifying features. Further, the selected first-order classifying feature, along with one or more previously selected first-order classifying features from the list, can be sent to a higher-order feature generator where the selected first-order classifying feature can be paired with the each of the one or more previously selected first-order classifying features, to generate one or more higher-order features for the image.

Figure 5:
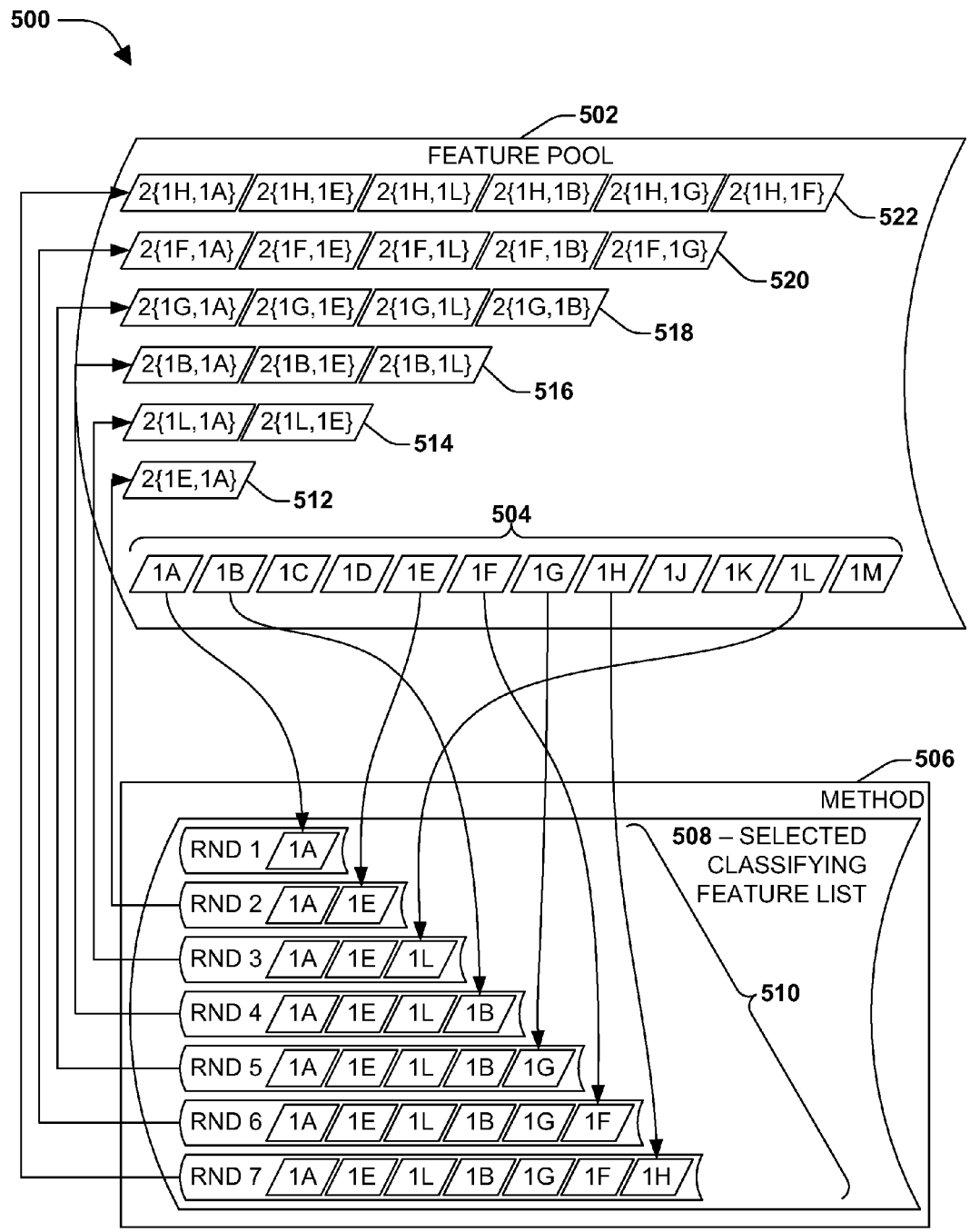
FIG. 5 is a block diagram illustrating a portion of an exemplary method for performing image feature extraction.

FIG. 5 illustrates an example 500 of a portion of an exemplary method for integrated feature selection and extraction (e.g., as described above). In the example 500, before feature selection begins (e.g., for training an image classifier), pre-extracted first-order features 504 populate a feature pool 502 for an image. In a first round of feature selection, the exemplary method 506 selects a first-order feature 504 (e.g., as determined by a feature selection algorithm) from the feature pool 502 and adds it to a selected classifying feature list 508 at 510. After the first round of feature selection, the feature pool 502 merely contains the pre-extracted first-order features 504. In a second round, the exemplary method 506 selects another first-order feature 504 from the feature pool 502 and adds it to the selected classifying feature list 508 at 510. In this example, during the second round of selection, the exemplary method 506 pairs the selected classifying features 510 from the selected classifying feature list 508 to generate a second order feature 512 (e.g., a descriptor for a spatial relationship between the first selected classifying feature and the second selected classifying feature), which is placed into the feature pool 502. Therefore, after the second round of feature selection, the feature pool 502 is populated with the first-order features 504 and one second-order feature 512. As classifying feature selection continues, the method 506 adds newly classifying selected features from rounds 510 to the selected classifying feature list 508. At round three of the classifying feature selection, for example, the method pairs the newly selected classifying feature 510 with the previously selected classifying features 510 present in the selected classifying feature list 508 from the previous selection rounds. Two new second-order features 514 are extracted in round three and sent back to the feature pool 502. Therefore, after three rounds of classifying image selection, the feature pool 502 contains the first-order features 504 and the second order features generated by rounds one 512 and two 514. The selection and extraction process is iterative, and continues until the selection process ends (e.g., the feature selection algorithm has ended due to a preset limit or, for example, an accuracy measure has been reached for a image classification trainer). During round seven of the classifying feature selection, the exemplary method 506 pairs the newly selected classifying feature (1H) 510 with the previously selected classifying features 510 present in the selected classifying feature list 508 from the previous selection rounds. Six new second-order features 522 are extracted in round seven and sent back to the feature pool 502. In this example, the method 506 merely selected first-order features from the feature pool; however, for example, a feature selection algorithm (e.g., a boosting algorithm for image classification) may also select second-order features from the feature pool 502 as determined by the selection algorithm.

In another aspect, once higher-order features (e.g., second-order features representing a spatial relationship between two first-order features, or third-order features representing a spatial relationship between three first-order features, etc.) have been generated for an image, the higher-order features are placed back into an image feature pool from which classifying features may be selected. In this aspect, for example, the image feature pool is enhanced by the higher-order features "on-the-fly," and a selection algorithm may select these higher-order features for image classification. Because misclassification of an image object, for example, can be mitigated by selection of higher-order features, the "on-the-fly" enhancement of the image feature pool may allow for a faster and more accurate image object classification.

Figure 6:
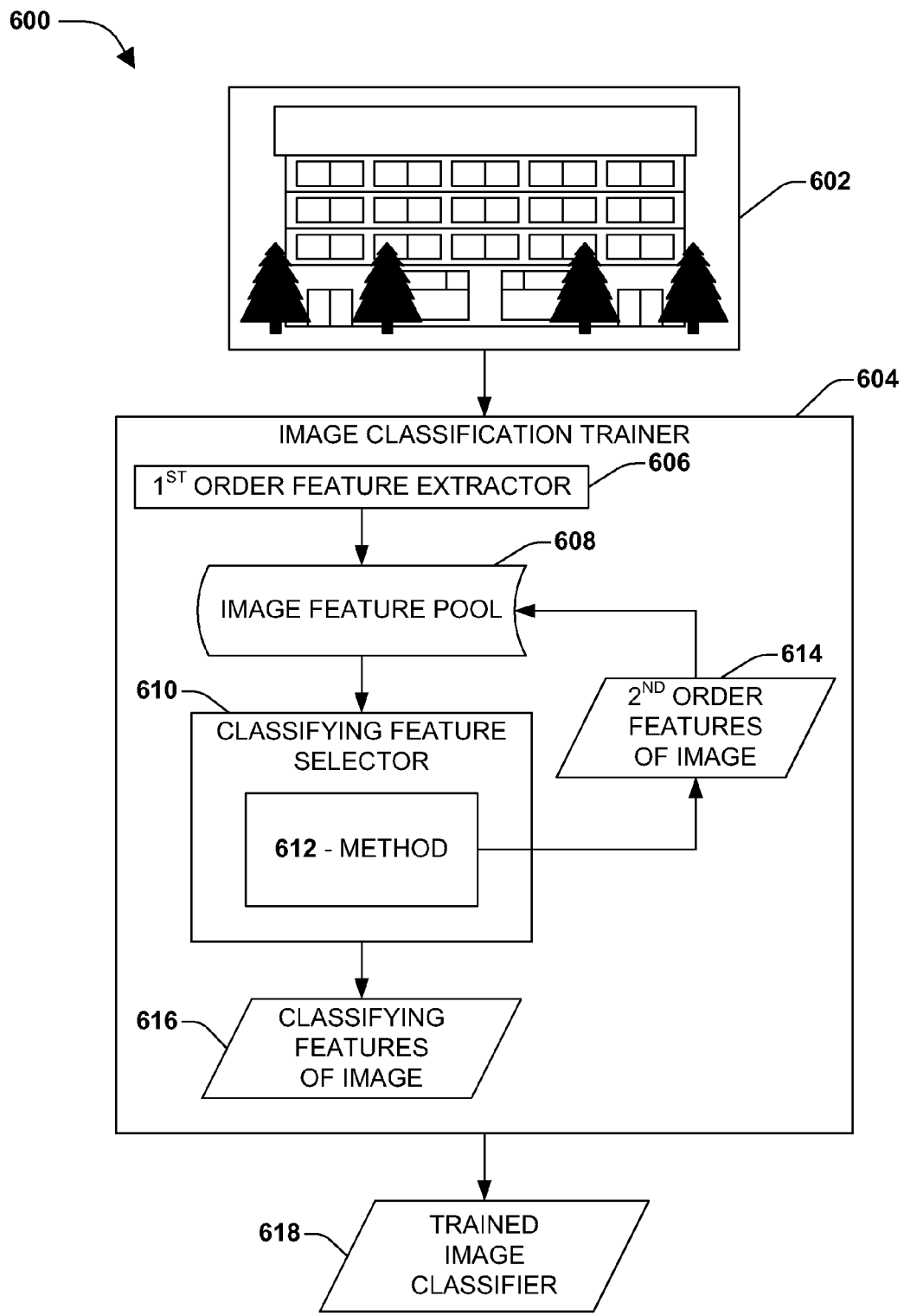
FIG. 6 is an illustration of an exemplary method for integrated feature selection and extraction being utilized in an image classifier.

FIG. 6 illustrates an example 600 of how the techniques and systems described herein may be used in an image classification trainer. In the example 600, a training image 602 (or set of training images) is sent to an image classification trainer 604 (e.g., in order to determine object classification for the image, for example, "what features can be used to classify this type of image."). In this example, the image classification trainer contains a first order feature extractor 606, which pre-extracts (e.g., extracts prior to feature selection) a pre-determined (e.g., based on settings for the image classification trainer) first-order features from the image (e.g., descriptors of statistical information for pixel neighborhoods or patches of the image) and populates an image feature pool 608 with the extracted first-order features. The image classification trainer 604 contains a classifying feature selector 610 (e.g., an AdaBoost weighted sum feature selection classifier), which selects features from the image feature pool 608 based on a configuration of the image classification trainer 604. An exemplary method 612 (e.g., as discussed with regard to FIGS. 1, 2, 4 and/or 5) is integrated into the classifying feature selector 610, which extracts higher order (e.g., second-order) features 614 of the image 602, "on-the-fly" as first-order features are selected by the classifying feature selector 610. The second-order features 614 of the image 602 are sent back to the image feature pool 608, which may be selected by the classifying feature selector 610 for classifying features 616 of the image 602. In this example, the classifying features 616 of the image 602 may be used to develop a trained image classifier 618 for the image (or set of images) 602.

Figure 7:
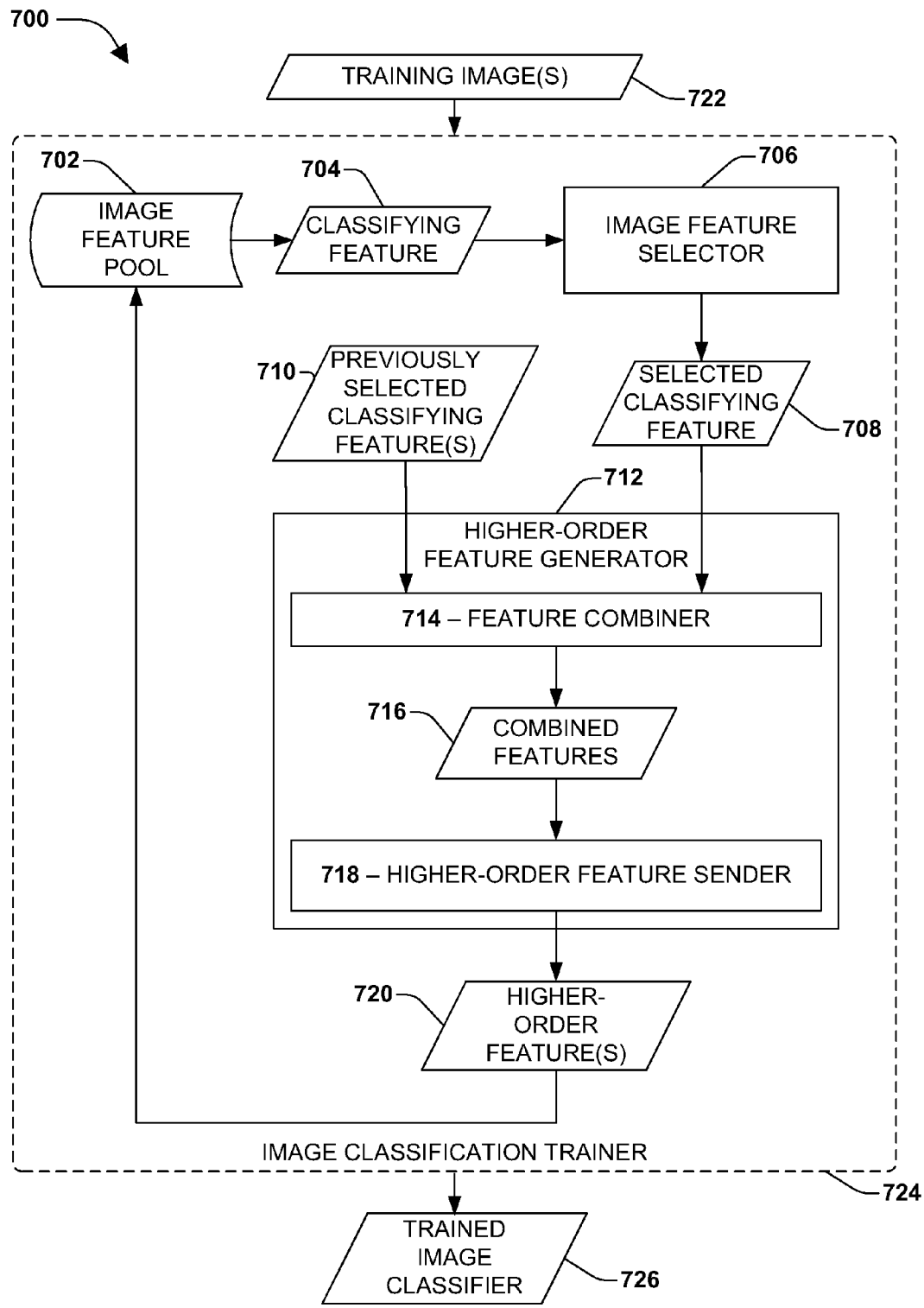
FIG. 7 is a block diagram of an exemplary system for integrated feature selection and extraction for training image classifiers.

A system may be configured for integrated selection and extraction of features from an image, for example, for training image classifiers. An embodiment of a system for integrated selection and extraction of features is illustrated in FIG. 7. In exemplary system 700, an image classification trainer 724 comprises an image feature selector 706, configured to select classifying features, selects a classifying feature 704 from an image feature pool 702. The selected classifying feature 708 and one or more previously selected classifying features 710 are sent to a higher-order feature generator 712 configured to generate one or more higher-order features for an image. The higher-order feature generator 712 contains a feature combiner 714 configured to pair the selected classifying feature 708 with one or more respective previously selected classifying features 710 to generate one or more combined features 716. A higher-order feature sender 718 sends one or more higher-order features 720 generated by the higher-order feature generator 712 to the image feature pool 702. In this example, a training image 722 (or a set of training images) may be input to the image classification trainer 724, resulting in a trained image classifier 726.

Figure 8:
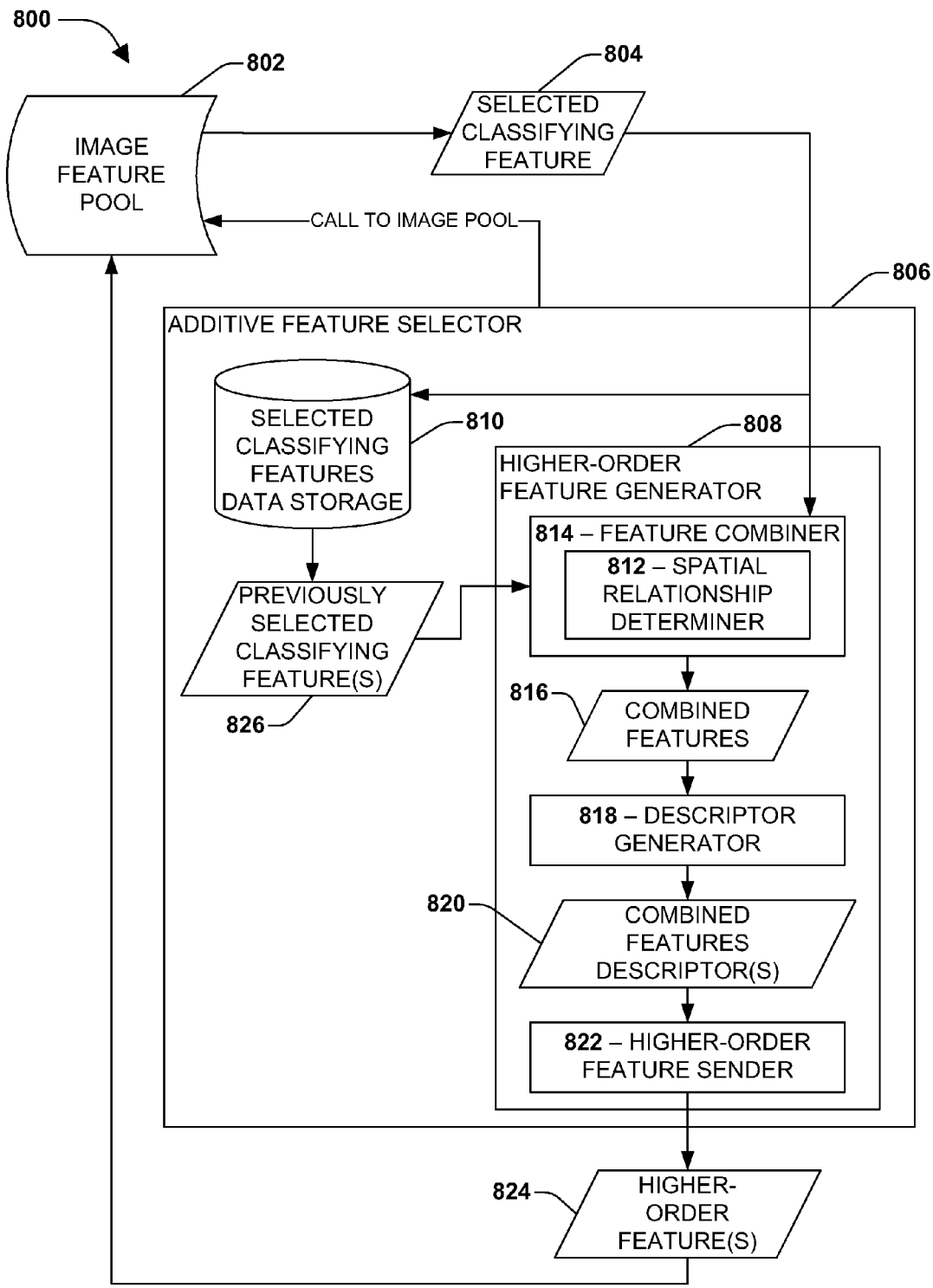
FIG. 8 is a block diagram of another exemplary system for integrated feature selection and extraction for training image classifiers.

Another embodiment of this system is illustrated in FIG. 8 by an exemplary system 800. In this example, an additive feature selector 806 (e.g., a discrete AdaBoost algorithm with decision stumps) calls to an image feature pool 802 for a selected classifying feature 804. The additive feature selector 806 stores the selected classifying feature 804 in a selected classifying features data storage 810 and also sends the selected classifying feature 804 to a higher-order feature generator 808, configured to generate higher-order features for an image. It will be appreciated that the higher order feature generator 808 is depicted as comprised within the additive feature selector 806 in order to, for example, integrate image feature selection and higher-order feature generation (extraction). However, in other embodiments the higher order feature generator 808 may be coupled outside of the additive feature selector 806. In the higher-order feature generator 808, a feature combiner 814, configured to pair the selected classifying feature 804 and one or more previously selected classifying features 826, collects the selected classifying feature 804, as well as one or more previously selected classifying features 826 from the selected classifying features data storage 810. A spatial relationship determiner 812 determines a spatial relationship in the image between the selected classifying feature 804 and one or more previously selected classifying features 826. The combined features 816 generated by the feature combiner 814 are sent to a descriptor generator 818, which generates one or more combined feature descriptors 820 for the one or more combined features 816 representing the spatial relationship. A higher-order feature sender 822 sends higher-order features 824 to the image feature pool 802.

It will be appreciated, that the embodiment illustrated by the exemplary system 800 in FIG. 8, may be incorporated into an image classification trainer, for example, as illustrated by 724 of exemplary system 700, in FIG. 7. In this example, as described above, a set of training images may be input to the image classification trainer, resulting in a trained image classifier.

Figure 9:
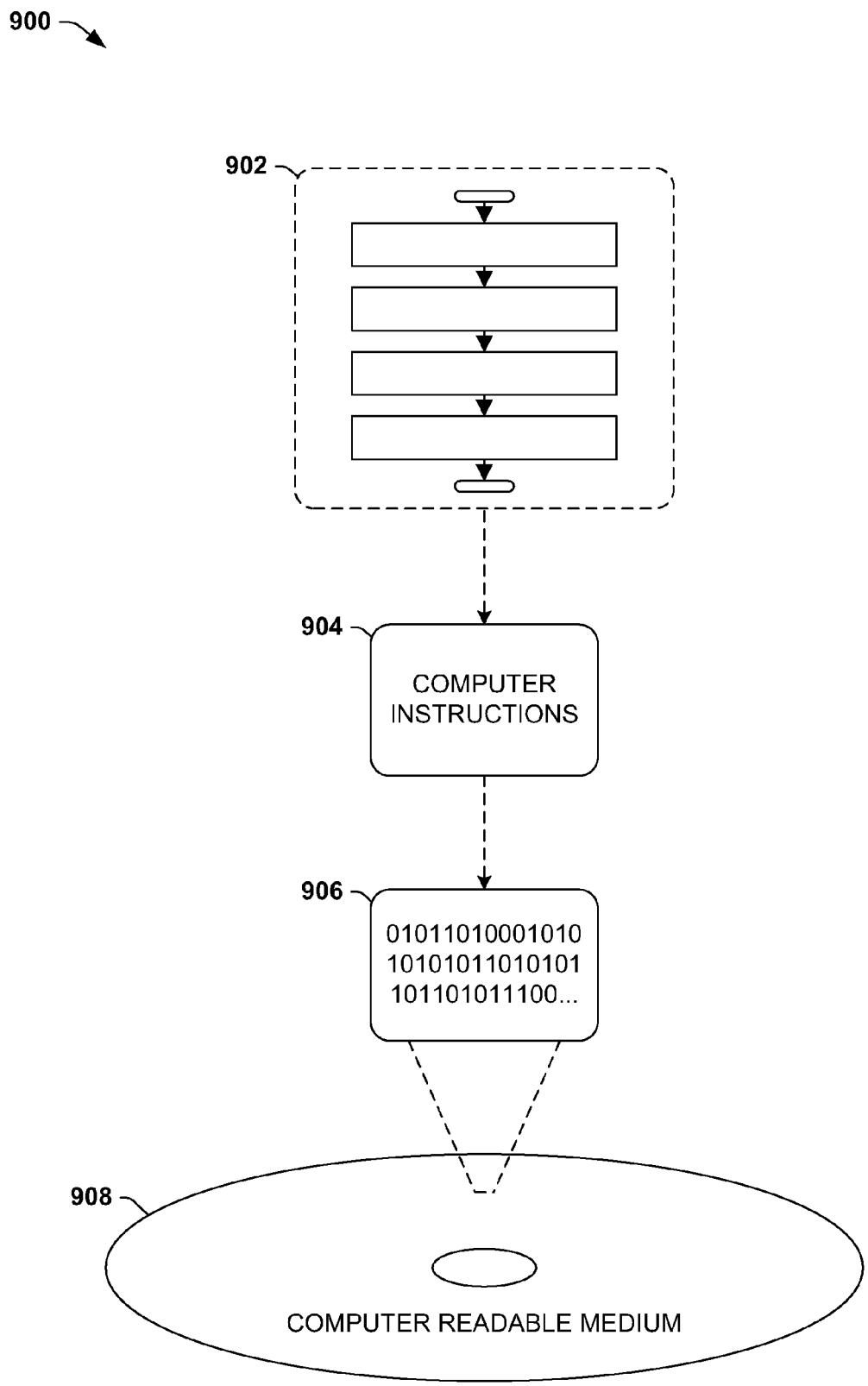
FIG. 9 is an illustration of an exemplary computer-readable medium comprising processor-executable instructions configured to embody one or more of the techniques provided herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to the principles set forth herein. In one such embodiment, the processor-executable instructions 904 may be configured to perform a method 902 for integrating image feature selection and extraction, such as the method 100 of FIG. 1, for example. Many such computer-readable media may be devised by those of ordinary skill in the art that are configured to operate in accordance with the techniques presented herein.

Figure 10:
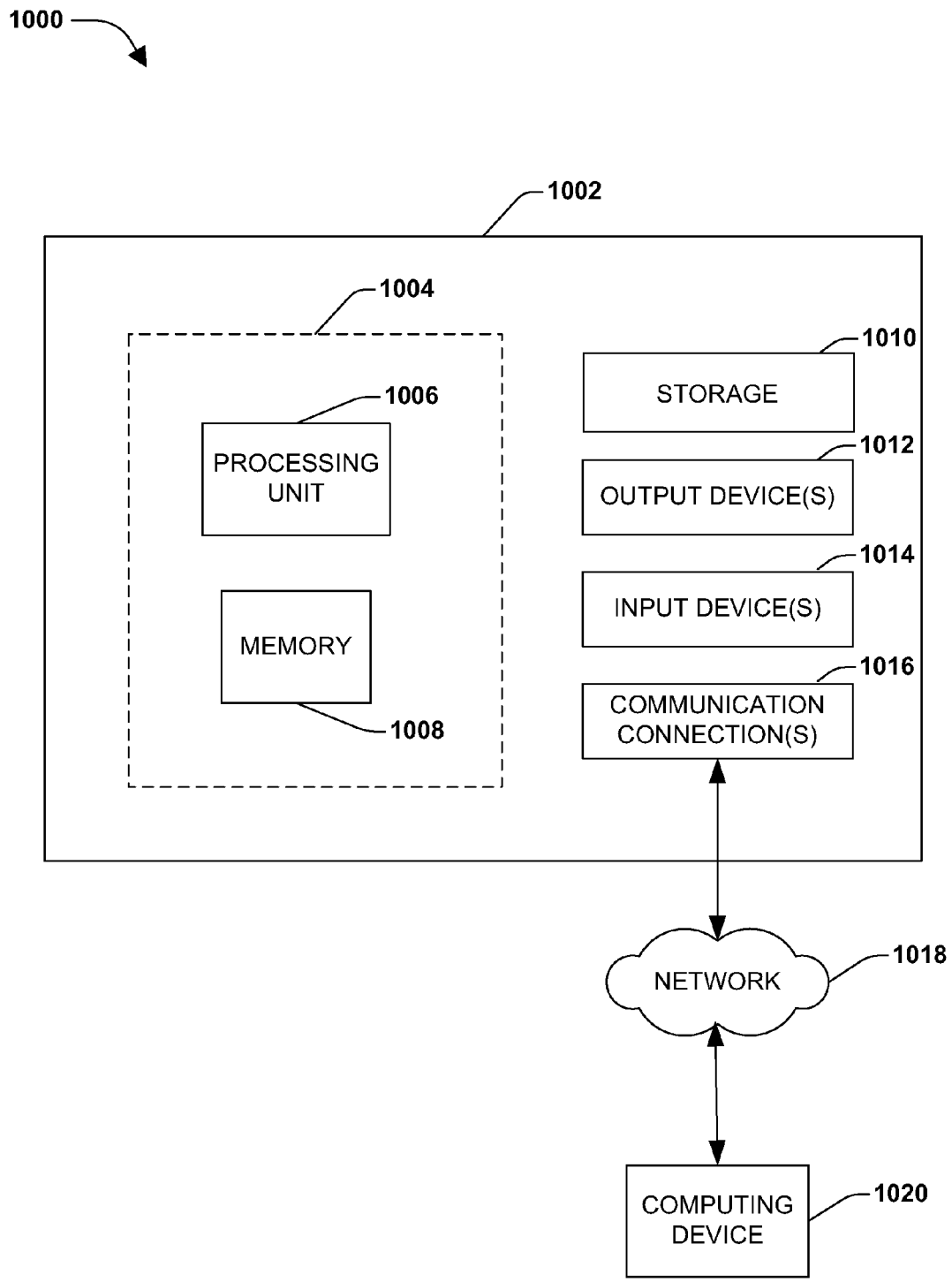
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is merely one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1002 configured to implement one or more embodiments provided herein. In one configuration, computing device 1004 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer storage media. Computer storage media includes volatile and nonvolatile, removable and non-removable media implemented in any method or technology for storage of information such as computer readable instructions or other data. Memory 1008 and storage 1010 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1002. Any such computer storage media may be part of device 1002.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices. Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1012.

Components of computing device 1002 may be connected by various interconnects, such as a bus. Such interconnects may include a Peripheral Component Interconnect (PCI), such as PCI Express, a Universal Serial Bus (USB), firewire (IEEE 8394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network. For example, a computing device 1020 accessible via network 1018 may store computer readable instructions to implement one or more embodiments provided herein. Computing device 1002 may access computing device 1020 and download a part or all of the computer readable instructions for execution. Alternatively, computing device 1002 may download pieces of the computer readable instructions, as needed, or some instructions may be executed at computing device 1002 and some at computing device 1020.

Various operations of embodiments for retargeting videos are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited merely by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to merely one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for performing integrated feature selection and extraction for classifying an image, the method comprising:
   selecting a classifying feature from a feature pool for the image;
   generating one or more higher-order features comprising:
      pairing the selected classifying feature with one or more respective previously selected classifying features; and
   placing the one or more higher-order features into the feature pool.

2. The method of claim 1, comprising:
   creating an initial feature pool comprising extracted first order features for the image, the first order features comprising features originated from local feature descriptors.

3. The method of claim 1, the respective one or more higher-order features representing a relationship between the selected classifying feature and at least some of the one or more respective previously selected classifying features.

4. The method of claim 3, the relationship comprising a spatial relationship.

5. The method of claim 1, comprising representing the image as a feature vector, the feature vector comprising:
   respective features corresponding to one or more respective codewords; and
   values of the respective features comprising normalized histogram bin counts of the one or more respective codewords.

6. The method of claim 1, selecting a classifying feature comprising using an additive feature selection algorithm.

7. The method of claim 1, selecting a classifying feature comprising:
   placing the selected classifying feature in at least one of one or more lists of selected classifying features.

8. The method of claim 7, the one or more lists of selected classifying features comprising at least one of:
   a list of selected first order classifying features;
   a list of selected higher-order classifying features of a same order; or
   a list of selected higher-order classifying features.

9. The method of claim 1, generating one or more higher-order features comprising:
   generating respective descriptors that describe a functional relationship between the respective one or more previously selected classifying features and the selected classifying feature.

10. The method of claim 1, the pairing comprising determining a spatial relationship between the selected classifying feature and the respective one or more previously selected classifying features.

11. The method of claim 10, determining a spatial relationship comprising using one or more spatial histograms.

12. The method of claim 10, determining a spatial relationship comprising:
   generating one or more spatial histograms for respective instances of the selected classifying feature in the image, the spatial histograms comprising the instance of the selected classifying feature as a center;
   determining a number of instances that a previously selected classifying feature falls into respective bins of the spatial histogram for the respective one or more previously selected classifying features; and
   normalizing the respective spatial histograms.

13. The method of claim 12, normalizing comprising:
   combining bin counts for corresponding bins in the respective one or more spatial histograms; and
   dividing the combined bin counts by the number of instances of the selected classifying feature in the image for respective combined bins in the spatial histograms.

14. A system for performing integrated feature selection and extraction for classifying an image, the system comprising:
   an image feature selector configured to select a classifying feature from a feature pool for an image; and
   a higher-order feature generator, operably coupled to the image feature selector, configured to generate one or more higher-order features for the image, the higher-order feature generator comprising:
      a feature combiner configured to pair the selected classifying feature with one or more respective previously selected classifying features; and
      a higher-order feature sender configured to place the one or more higher order features into the feature pool, at least some of at least one of the image feature selector or the higher-order feature generator implemented at least in part via a processing unit.

15. The system of claim 14, the image feature selector comprising an additive feature selection algorithm.

16. The system of claim 14, the higher-order feature generator comprised within the image feature selector, the image feature selector configured to integrate selection of a classifying feature from a feature pool and generation of one or more higher-order features for the image.

17. The system of claim 14, the image feature selector comprising a selected classifying features data storage configured to store one or more lists of selected classifying features.

18. The system of claim 14, the higher-order feature generator comprising a descriptor generator configured to generate respective descriptors that describe a spatial relationship between the respective one or more previously selected classifying features and the selected classifying feature.

19. The system of claim 14, the feature combiner comprising a spatial relationship determiner configured to determine a spatial relationship between the selected classifying feature and the respective one or more previously selected classifying features.

20. A method for performing integrated feature selection and extraction for classifying an image, the method comprising:
   creating an initial feature pool, comprising extracted first order features for the image;

selecting a classifying feature from a feature pool for the image using an additive feature selection algorithm, the selecting comprising:
  placing the selected classifying feature in at least one of one or more lists of selected classifying features; and
generating one or more higher-order features comprising:
  pairing the selected classifying feature with one or more respective previously selected classifying features, the pairing comprising:
    determining a spatial relationship between the selected classifying feature and the respective one or more previously selected classifying features, the determining comprising:
      generating one or more spatial histograms for respective instances of the selected classifying feature in the image, the spatial histograms comprising the instance of the selected classifying feature as a center;
      determining a number of instances that a previously selected classifying feature falls into respective bins of the spatial histogram for the respective one or more previously selected classifying features; and
      normalizing the respective spatial histograms;
    generating respective descriptors that describe a functional relationship between the respective one or more previously selected classifying features and the selected classifying feature; and
  placing the one or more higher-order features into the feature pool.

* * * * *